Jan. 27, 1959 H. T. STEVINSON 2,870,871
SHOCK ABSORBER
Filed May 20, 1955 2 Sheets-Sheet 1
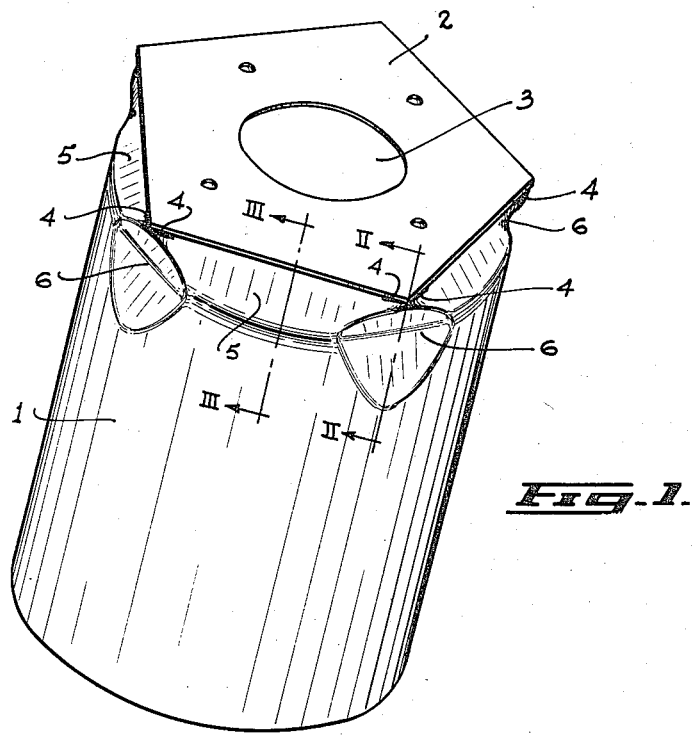
Fig. 1.
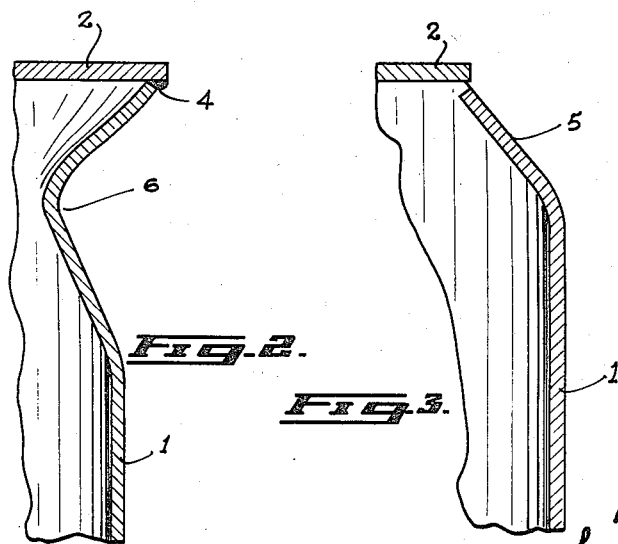
Fig. 2.
Fig. 3.
Inventor
Harry T. Stevinson
by Stevens Davis Miller Mosher
his attorneys Jan. 27, 1959 H. T. STEVINSON 2,870,871
SHOCK ABSORBER
Filed May 20, 1955 2 Sheets-Sheet 2
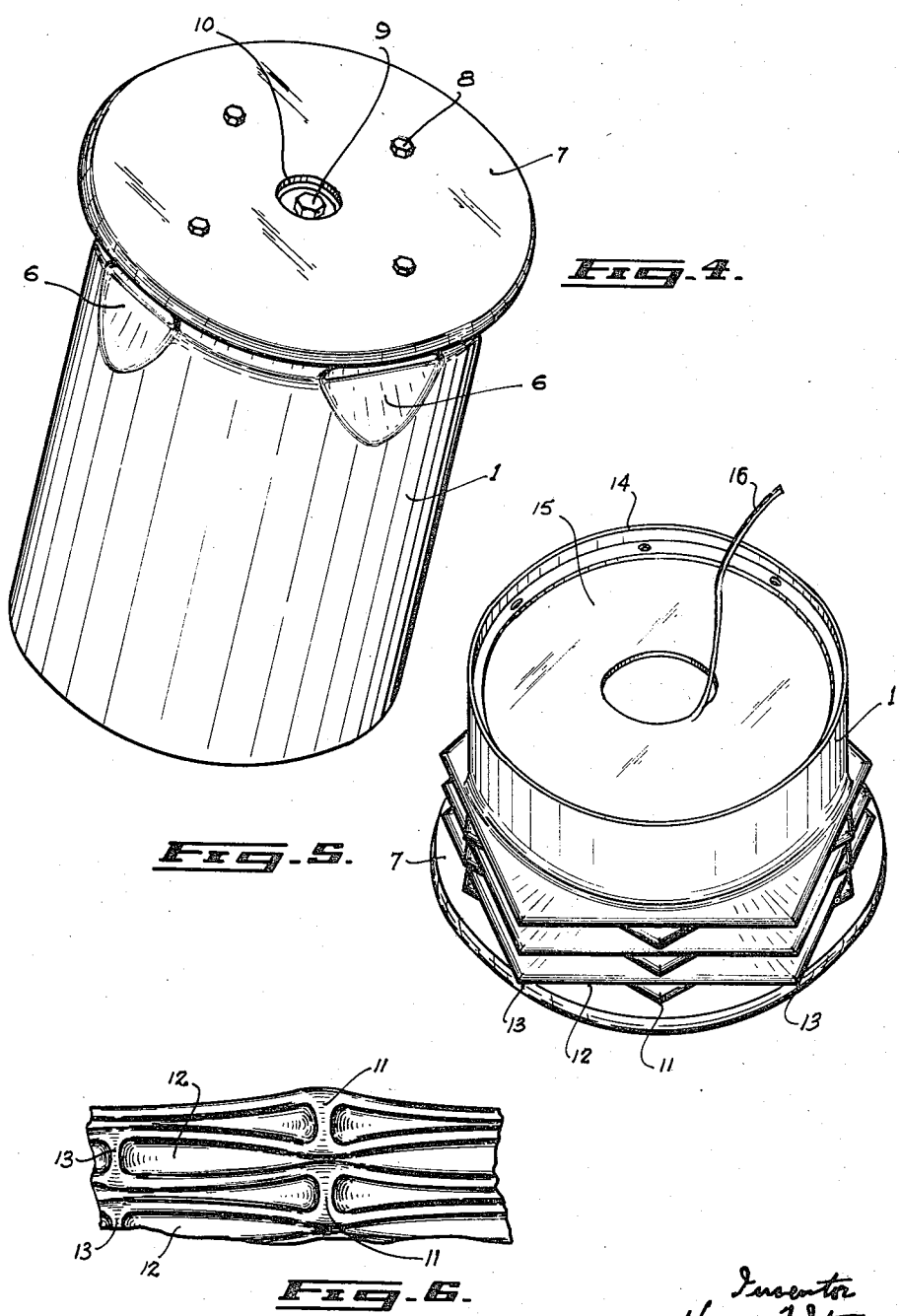

United States Patent Office 2,870,871
Patented Jan. 27, 1959

2,870,871

SHOCK ABSORBER

Harry T. Stevinson, Ottawa, Ontario, Canada, assignor to National Research Council, Ottawa, Ontario, Canada, a body corporate of Canada Application May 20, 1955, Serial No. 509,896

8 Claims. (Cl. 188—1)

This invention relates to a shock absorber device for use in bringing to rest a body travelling at a comparatively high velocity.

One application for which the shock absorber has been especially designed is for cushioning the shock experienced by supplies dropped from aircraft, on striking the ground. The device is also expected to have many other applications, for example, as a safety shock absorber for use at the foot of elevator shafts and in like emergency positions. It is also anticipated that the device will find wide application in arresting the movement of moving vehicles, trains, automobiles, etc., and particularly as a means for mounting bumper bars on road vehicles. For convenience, the invention will, however, be exemplified and explained below with special reference to its use as a so-called crash head in the dropping of articles from aircraft.

A theoretically perfect shock absorber is one that will provide a uniform retarding force throughout the full length of its stroke, since a constant retarding force will result in constant deceleration of the load. The perfect shock absorber should also have no rebound. Elastic shock absorbers, such as springs, pads, cushions and the like, provide a progressively increasing retarding force as they are compressed and do not absorb most of the energy but merely convert it into a different form which is later released in the rebound. It can be shown mathematically that an ideal shock absorber providing a constant retarding force equal to the maximum retarding force acceptable without damage to the load will bring the load safely to rest in half the distance of an elastic shock absorber in which the retarding force gradually builds up to such maximum acceptable retarding force.

It is the primary object of the present invention to provide a construction of shock absorber the characteristics of which will approximate those of the theoretically perfect shock absorber. Conditions approaching that of the ideal shock absorber can be obtained with known hydraulic types of shock absorbers, but these are complicated and costly devices which generally have a considerable weight that is particularly undesirable for use with a load being dropped from an aircraft.

A simple and inexpensive form of expendable shock absorber has now been developed, which consists of an elongated open-ended metal tube, preferably a cylinder, provided with weakened areas adapted to promote regular buckling, while exhibiting an acceptably constant resistance to such buckling.

It can be shown theoretically that a thin walled, squat cylinder when subjected to axial compression will buckle by folding. That is to say, a series of folds extending around the perimeter of the cylinder will first appear at one point, usually at one end, and, as the cylinder is further compressed, successive layers of further series of folds will build up along the length of the cylinder. Assuming that the compression force is uniformly and centrally applied along the axis of the cylinder, these folds will appear in a predetermined relationship. For each given ratio of cylinder diameter to wall thickness, there will be, for any given metal, a predetermined number of folds in the series extending around the periphery of the cylinder, into which the cylinder will tend naturally to buckle.

Unlike the elastic type of shock absorber which builds up from a low to a high retarding force as it is compressed, an unweakened cylinder will normally present a high retarding force initially, which falls off sharply once buckling has commenced. This characteristic is just as disadvantageous as the opposite characteristic of the elastic shock absorber. To avoid the initial high force required to buckle the cylinder, it is thus necessary to pre-weaken it, or in some other way arrange for the cylinder to start buckling at a force comparable with the force that will subsequently be necessary for causing the cylinder to continue to buckle.

According to the invention, this object is achieved by bending the metal at one part of the cylinder (or tube of whatever cross-section is chosen, since it is within the scope of the invention to employ a tube of non-circular cross-section) out of its normal contour in a manner such as to produce, at least in rudimentary form, an initial series of buckling folds. Advantage can then be taken of the discovery that there is a natural number of folds into which any given tube will tend to buckle by making the rudimentary folds identical in number to the natural folds. Preferably the part selected for weakening the tube will be one end, i. e. the end at which it is desired buckling should commence.

The invention will appear more clearly from the following specific description which refers to the accompanying drawings that illustrate preferred methods of carrying the invention into practice. In these drawings:

Figure 1 shows a general over-all perspective view of a cylindrical shock absorber according to the invention;

Figure 2 shows a fragmentary section on the line II—II of Figure 1;

Figure 3 shows a fragmentary section on the line III—III of Figure 1;

Figure 4 shows a view similar to Figure 1 of a modified form of a shock absorber according to the invention;

Figure 5 illustrates the operation of the shock absorber seen in Figure 4; and

Figure 6 shows an enlarged elevation view of a fragment of Figure 5.

Referring firstly to Figures 1 to 3, the device will be seen to consist of a squat, open-ended cylinder 1, i. e. a cylinder that will buckle by folding, rather than by bowing in the manner of an axially compressed thin column, one end of which cylinder is partially closed by a polygonal disc 2 having a central aperture 3. The term "open-ended" is employed to define a cylinder or tube at least one end of which is at least partially open to atmosphere, so that upon compression the resistance to buckling is determined by the characteristics and dimensions of the metal of the wall of the tube and not appreciably by any air pressure built up in the tube. This is in contradistinction to shock absorbers of the pneumatic or hydraulic types in which substantially no resistance to compression is provided by the wall itself but is the result of internally built-up pressure. The corners of the polygonal disc 2, which in the example is a pentagon, are each welded to one end of the cylinder 1 by a pair of short welds 4. At this end, the cylinder 1 is bent to conform generally with the peripheral shape of the disc 2, this being effected by the provision of five inwardly turned and substantially flat surfaces 5 that adjoin one another where the five points of the disc 2 are welded to the cylinder by the welds 4. At each of these corners, the cylinder 1 is depressed to form a shallow recess or depression 6 of approximately V-shape in section, so that there is formed around the cylinder 1 a circumferentially extending series of inwardly projecting, circumferentially elongated depressions. This circumferentially extending series is closed upon itself, i. e. forms a complete circle around the circumference of the cylinder, as distinct from extending helically around the cylinder. Although for convenience of illustration, the boundaries of these bent portions have been shown in Figure 1 as relatively sharp, it is to be understood that each surface will merge smoothly into its adjoining surface. Figures 2 and 3 illustrate in more detail the shape of the flat surfaces 5 and the depressions 6. The upper edges of the flat surfaces 5 are not connected to the edges of the disc 2 between the spaced welds 4, in order to allow relative movement between these parts as the cylinder 1 buckles.

When a shock absorber such as seen in Figure 1 is employed as a crash head for airborne supplies, the end of the cylinder formed with the rudimentary folds formed by the flat surfaces 5 and depressions 6, will be made the leading end of the load. The other end of the cylinder 1 will then be connected by convenient means to a further cylinder (not shown) in which the supplies are housed, such further cylinder preferably constituting a continuation of the cylinder 1 so as together to form one complete cylindrical object. Tail fins may be employed to maintain this cylinder forwardly directed during flight, and one or more parachutes may be employed as necessary.

When the supplies are to be dropped onto comparatively soft ground, it may be necessary to furnish the crash head with a nose plate to prevent its diving too deeply into the earth. An example of a shock-absorbing device of the type seen in Figure 1, but also fitted with a nose plate, is seen in Figure 4. In this view, the cylinder 1 is identical with that illustrated in Figures 1 to 3 in that flat surfaces 5 and depressions 6 are provided. The surfaces 5 are virtually obscured from view in Figure 4 by the nose plate. The disc 2 (also no longer visible) is covered by a circular nose plate 7 secured to such disc by convenient means such as bolts 8. The diameter of the nose plate 7 is slightly greater than the maximum diameter of the disc 2, so that the nose plate 7 slightly overlaps each of the corners of such disc. The central aperture 3 in the disc 2 is preferably closed in by a suitable small circular disc (not visible) which is then secured to the nose plate 7 by a further bolt 9 centrally situated in a shallow recess 10 formed in the outer surface of the nose plate 7. Although this closing of the aperture 3 will tend to prevent escape of air from the cylinder 1, there will normally be sufficient gap provided between the upper edges of the flat surfaces 5 and the underside of the disc 2 to enable the air to escape sufficiently rapidly when the shock absorber is buckled, so that the cylinder is still effectively "open-ended." If this is not found to be the case, then additional provision for the escape of air can be made, but it should be understood that (as will be more fully explained below) there will normally be the possibility of air escaping from the other end of the cylinder 1. One way or the other, provision will be made for escape of air.

Figure 5 shows diagrammatically how the cylinder 1 will buckle on the application of a sudden, large axial compression force, such as experienced on striking a hard surface at high speed. It should be appreciated that Figure 5 is more in the nature of an artist's impression of the exact nature of the folds, since these in practice are seldom as regular and symmetrical as in the drawing. This is so because the properties of the metal are seldom absolutely identical from point to point in the cylinder, and because, when used as a crash head for landing supplies from aircraft, the forces applied to the shock absorber are seldom purely axial. There is normally compounded with the axial force a transverse force resulting from the forward horizontal component of the movement of the body when it strikes the ground, and from the fact that the nose plate 7 will seldom come simultaneously into contact with the ground over its entire surface, one edge normally striking first. Figure 5, nonetheless, serves to illustrate the basic over-all operation, under ideal conditions, of a shock absorber constructed in accordance with the present invention. The enlarged fragmentary view of Figure 6 has been provided to illustrate more accurately the true shape that the folds assume. It will be seen from Figure 5 how, at the end of the cylinder at which buckling commences, each of the flat surfaces 5 has, on application of the axial force, been bent further inwardly to form a circumferential series of contiguous, inwardly projecting, straight folds exhibiting five points 11 joined by substantially straight edges which have developed from the rudimentary flat surfaces 5. Then, as the compression force persisted, a second similar series of folds was formed in opposite phase to the folds of the first series. Thus, relatively straight edges 12 were formed extending between a further series of five points 13, the edges 12 having developed from the straight edges that previously existed along the valleys of the depressions 6. As the buckling continues this process is repeated with each adjacent series of folds out of phase and each alternate series of folds theoretically in register with one another. The formation of each series of folds requires considerable energy and it is in this way that the kinetic energy of a moving body is absorbed. Finally, after the body has been decelerated to zero, the cylinder 1 will appear something like the illustration seen in Figure 5, with possibly one or two additional series of folds.

Figure 5, which is a view of the cylinder 1 from the opposite end from that seen in Figures 1 to 4, also serves to show further optional features, namely an end flange 14 and secured thereto a central disc 15 which is spirally grooved on its undersurface to provide a tearaway metal ribbon 16. The free end of this ribbon 16 will be connected to the body of the load which is otherwise comparatively loosely secured to the flange 14. On striking the ground, the crash head may embed itself to some extent in the ground and in any case will have some tendency to remain in the position in which it fell and thus act as an anchor for the body of the load which it is normally intended will, at this time, e. g. on striking the ground but after buckling of the crash head, separate from the crash head and continue to travel horizontally along the ground, by reason either of its forward momentum and/or by reason of any drag that a parachute may exert on it. The ribbon 16 will then serve to maintain connection between these two parts and to exert a retarding force on the body of the load. The construction of the disc 15 from which the ribbon 16 is torn is believed to constitute a separate invention and has been more fully described and claimed in my copending United States patent application of even date Serial No. 509,895, and now Patent No. 2,785,775.

In addition to having the effect of spreading the load when the crash head lands on soft earth and thus preventing the crash head diving too deeply into the ground, the nose plate 7, due to its slightly larger diameter, has the effect that any hole which the crash head does form in the ground on landing, will be slightly oversize in relation to the cylinder diameter, and this will facilitate toppling over of the load either with or without the crash head. Furthermore, the outer edge of the nose plate 7 tends to form a ledge against which the initial folds of the metal may press on buckling. There is thus less tendency for the metal to overlap the edge of the disc 2 and form an irregular fold.

The choice of metal in a shock absorber to be used as a crash head will normally lie between steel and aluminum. It is necessary that the metal be ductile and, when steel is chosen, it is preferable to use a deep drawing steel, e. g. one that must accept elongation of up to 45% without breaking. Steel is chosen when light weight is important, because it exhibits a better strength to weight ratio than aluminum. Aluminum will normally be chosen if corrosion resistance is an important requirement. For uniformity of buckling it is desirable to use seamless stock where this is available, although, if special care is taken, it is possible to weld from sheet metal a cylinder that will perform sufficiently uniformly to provide satisfactory operation.

In selecting the dimensions of a shock absorber, it will often be found, especially in the case of a shock absorber to be used as a crash head, that the diameter is already determined by the diameter of the load, since it is normally desirable that these form one continuous cylinder. If the diameter is not so predetermined, then it will normally be made small for economy of weight, except that, if the supplies are to be dropped in a high wind or with a high forward velocity, e. g. from a low altitude, the diameter will be chosen large to ensure that the required degree of buckling is experienced before the crash head topples. Having chosen the diameter of the cylinder, the thickness of the metal is then selected in accordance with the acceptable buckling force which can be withstood by the load to which the shock absorber is secured. This will be determined by the degree of fragility of the load. The thickness is determined by the formula $$F = 2_\pi K_c E t^2$$

where $F$ = the buckling force;
$K_c$ is a constant for a given buckled waveform;
$E$ = Young's Modulus of the metal; and
$t$ = the wall thickness of the metal.

This is actually the formula for a non-weakened cylinder, but it has been found that the relationship may usefully be employed to determine the thickness to be employed in a pre-weakened cylinder such as used with the invention, if $K_c$ is given a value that allows for the initial bend angle given to the pre-weakened end of the cylinder. Experiments have shown that the maximum probable value for $K_c$ with a thin walled steel cylinder may be taken as roughly 0.3 if no pre-weakening is used (with the other dimensions expressed in pound and inch units). Experiments with pre-weakened cylinders constructed in accordance with the present invention have given an average value for $K_c$ of about 0.03. This means that crushing would commence at a load roughly one-tenth of that required to start a straight cylinder, and it is found that the cylinder will then continue to crush on the application of a force of this same order. The fact that the initial buckling strength of the cylinder is reduced ten-fold is not a serious disadvantage, since the strength increases as the square of the wall thickness and it is quite practical to obtain the necessary strength by a relatively small increase in the wall thickness.

As stated above, there is a relationship between the number of natural folds into which the cylinder will buckle and the ratio between the cylinder radius and its wall thickness. Theoretical and experimental data concerning the axial compression of circular cylinders is given in a report of Joseph Kempner entitled "Post-buckling Behavior of Axially Compressed Circular Cylindrical Shells" published in the Journal of The Aeronautical Sciences for May 1954. Kempner plots a parameter $\eta$ which is equal to $n^2 t/R$, where $n$ is the number of circumferential waves in the buckled cylinder, $t$ is the cylinder wall thickness; and $R$ is the mean radius of the cylinder. The parameter $\eta$ is not entirely constant, but it varies only from 0.20 to 0.28 over a fairly wide range of a parameter $\mu$ of 0.3 to 1.7; $\mu$ being the ratio between the circumferential and axial wavelengths. $\eta$ falls off gradually with increasing $\mu$ above 1.7. No exact mathematical relationship between $n$ and the ratio of R to $t$ has yet been determined. For purposes of constructing a shock absorber with a polygonal disc with the ideal number of sides, a first approximation of the value of $n$ in any given case can be determined from the data given by Kempner, and the nearest whole number then confirmed experimentally; or it is quite practicable to determine this number by an entirely trial and error experimental approach.

If the number of sides of the polygonal disc 2 should differ from the natural number of folds, the shock absorber will commence to buckle with folds equal in number to the sides of the polygonal disc, but, at some stage during the buckling, the number of folds will change and will tend to assume the natural number. If the disc 2 were a triangle for example, while the natural number for the cylinder were five, initially there would be three folds in a circumferential series; then probably one or two series with four folds would appear; and finally the natural tendency to form five folds would predominate and the remaining series of folds would be in this form. A similar reduction in the number of folds per series would take place if the disc 2 had more sides than the natural number. This changing over from one number of folds to another is detrimental both to uniformity of buckling and to uniformity of retarding force, and it is thus highly desirable to pre-weaken the cylinder in a manner inducive to the formation of a series of folds equal in number to a natural series.

In a test conducted on a steel shock absorber of 12-inch diameter; 12.5 inch length; a wall thickness of 0.087 inch (a radius to metal thickness ratio of approximately 72.5); and using a pentagonal disc 2 (a natural number of 5 folds is believed to be applicable in most cases in which the cylinder radius to metal thickness ratio lies within a range of approximately 70:1 to approximately 90:1), the specimen commenced to buckle at approximately 35,000 pounds. A curve of force against deflection of the cylinder was obtained. At no point did this curve fall below 25,000 pounds and at no point did it rise above 44,000 pounds. The curve was generally irregular, consisting of alternate series of upper and lower peaks, each peak no doubt representing a critical instant during the formation of each successive series of folds. The mean force remained substantially constant at about 33,000 pounds from one end of the curve to the other until the total length of the shock absorber had been reduced to about 3 inches. The force necessary to continue to compress the shock absorber then increased enormously, since the entire side of the cylinder had been buckled.

When the speed of crushing becomes high, some increase in strength may be expected because of a tendency for the steel to exhibit some viscosity characteristics when subjected to plastic flow. This increase in strength, although it may be necessary to take it into account when computing the initial dimensions, will not normally be detrimental to attainment of uniformity of retarding force which is the primary object of the shock absorber according to the present invention.

I claim:

1. A shock absorber comprising a squat, open-ended metal tube formed with a plurality of inwardly projecting, circumferentially elongated depressions arranged around said tube in a circumferentially extending series closed upon itself, such depressions constituting, at least in rudimentary form, a circumferential series of contiguous, inwardly projecting, straight folds.

2. A shock absorber as claimed in claim 1, wherein the number of said depressions is equal to the number of folds into which the tube will naturally collapse upon the application of an axial compressive force.

3. A shock absorber comprising a squat open-ended metal tube formed with a first plurality of inwardly projecting circumferentially elongated depressions arranged around said tube in a circumferentially extending series closed upon itself, such depressions constituting, at least in rudimentary form, a circumferential series of contiguous, inwardly projecting, straight folds, and a second plurality of similar depressions arranged around said tube in a second circumferentially extending series closed upon itself, such latter depressions also constituting, at least in rudimentary form, a circumferential series of contiguous inwardly projecting straight folds, said second series being closely axially spaced from said first series and the depressions of said second series being in staggered relationship to the depressions of said first series.

4. A shock absorber comprising a squat, open-ended metal cylinder, one end of which is distorted into a regular polygon, said cylinder being provided with a plurality of inwardly projecting, circumferentially elongated depressions arranged around said cylinder in a circumferentially extending series closed upon itself, each such depression being closely axially spaced from a respective apex of the polygon.

5. A shock absorber as claimed in claim 4 wherein the number of sides of such polygon is equal to the number of folds into which the cylinder will naturally collapse upon the application of an axial compressive force.

6. A shock absorber as claimed in claim 4, including a polygonal disc corresponding in shape to the polygonal end of said cylinder, said disc being secured to said end at independent circumferentially spaced points.

7. A shock absorber as claimed in claim 6, including a circular disc secured to the outer surface of said polygonal disc, said circular disc being of diameter slightly greater than the largest diameter of said polygonal disc.

8. A shock absorber as claimed in claim 6, wherein said metal is deep-drawing steel, the ratio of the radius of the cylinder to the wall thickness thereof is within the range of approximately 70:1 to approximately 90:1 and said disc is a pentagon.

References Cited in the file of this patent

UNITED STATES PATENTS

| | | |
|---|---|---|
| 1,180,095 | Wilson | Apr. 18, 1916 |
| 1,331,543 | Voshardt | Feb. 24, 1920 |
| 1,608,780 | Eaton | Nov. 30, 1926 |
| 1,698,164 | Mallory | Jan. 8, 1929 |
| 2,254,157 | Shaw | Aug. 26, 1941 |
| 2,363,249 | Hutchinson | Nov. 21, 1944 |
| 2,457,205 | Campbell et al. | Dec. 28, 1948 |
| 2,576,658 | Werner | Nov. 27, 1951 |
| 2,607,509 | Hess | Aug. 19, 1952 |